(12) United States Patent
Dopp et al.

(10) Patent No.: US 7,455,929 B2
(45) Date of Patent: Nov. 25, 2008

(54) AIR CELL WITH IMPROVED LEAKAGE RESISTANCE

(75) Inventors: Robert B. Dopp, Marietta, GA (US); John C. Bailey, Columbia Station, OH (US); Richard L. Middaugh, Rocky River, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 751 days.

(21) Appl. No.: 10/817,557

(22) Filed: Apr. 2, 2004

(65) Prior Publication Data

US 2005/0112458 A1     May 26, 2005

Related U.S. Application Data

(60) Provisional application No. 60/525,326, filed on Nov. 26, 2003.

(51) Int. Cl.
    *H01M 2/08*     (2006.01)
(52) U.S. Cl. .................. 429/174; 429/171; 429/184; 429/185
(58) Field of Classification Search .............. 429/27, 429/311, 332, 421, 174, 171, 184, 185, 163, 429/164, 166
See application file for complete search history.

(56) References Cited

U.S. PATENT DOCUMENTS

| | | | |
|---|---|---|---|
| 4,177,327 A | 12/1979 | Mathews et al. | 429/27 |
| 4,184,007 A | 1/1980 | Urry | 429/8 |
| 4,369,568 A | 1/1983 | Dopp | 29/623.2 |
| 4,439,500 A | 3/1984 | Gibbard et al. | 429/27 |
| 5,518,834 A | 5/1996 | Yoshizawa et al. | 429/59 |
| 5,587,259 A | 12/1996 | Dopp et al. | 429/233 |
| 5,977,685 A | 11/1999 | Kurita et al. | 310/311 |
| 6,545,391 B1 | 4/2003 | Su et al. | 310/332 |
| 2002/0050454 A1 | 5/2002 | Shahinpoor et al. | 204/421 |
| 2002/0195326 A1 | 12/2002 | Hunter et al. | 200/181 |
| 2003/0049508 A1 | 3/2003 | Iarochenko et al. | 429/27 |
| 2003/0156953 A1 | 8/2003 | Chinn et al. | 417/322 |

FOREIGN PATENT DOCUMENTS

| | | |
|---|---|---|
| CN | 1366356 A | 8/2002 |
| EP | 0 940 866 A2 | 9/1999 |
| JP | 55-090081 A | 7/1980 |
| JP | 04249867 | 9/1992 |
| JP | 05047388 A | 2/1993 |
| JP | 06267594 | 9/1994 |
| JP | 06349529 A | 12/1994 |
| JP | 10188923 A | 7/1998 |
| JP | 00040538 | 2/2000 |
| JP | 03036895 | 2/2003 |
| WO | 0036696 | 6/2000 |
| WO | 0038268 | 6/2000 |

*Primary Examiner*—Patrick Ryan
*Assistant Examiner*—Monique Wills
(74) *Attorney, Agent, or Firm*—Russell H. Toye, Jr.

(57) ABSTRACT

An electrochemical battery cell with an oxygen reduction electrode and having improved electrolyte leakage resistance. The cell includes a component, disposed between the oxygen reduction electrode and an air inlet in the cell housing, through or around which air can pass. Upon contact with electrolyte, the component is transformed to form an electrolyte seal.

54 Claims, 5 Drawing Sheets

Fig. 5

AIR CELL WITH IMPROVED LEAKAGE RESISTANCE

CROSS-REFERENCE TO RELATED APPLICATIONS

This application claims the benefit of U.S. Provisional Application No. 60/525,326, filed Nov. 26, 2003.

BACKGROUND

The present invention generally relates to electrochemical battery cells having an oxygen reduction electrode. More particularly, the present invention relates to air-depolarized and air-assisted cells which use oxygen contained in air from outside the cells.

Air-depolarized cells are cells that use oxygen from the surrounding atmosphere to produce electrochemical energy. Oxygen diffuses into the cell and is used as the active material, or reactant, of the positive electrode (cathode). The cathode, also referred to as the air electrode, contains a catalyst that promotes reaction of the oxygen with the electrolyte and ultimately the negative electrode (anode) active material. Because the cathode active material comes from outside the cell, the air electrode is not consumed during discharge of the cell. This means that the volume of the air electrode can be small compared to a cell in which the cathode active material is limited to that which is put into the cell when it is manufactured. Consequently, in an air-depolarized cell, referred to hereafter as an air cell, a larger proportion of the total cell volume can be devoted to the anode, and the volumetric energy density of the cell is increased. This is a desirable feature for batteries used to power electronic devices which have limited space for the batteries. Air depolarized cells can be made in a variety of sizes and shapes, from small button cells to large cylindrical cells for example. Primary aqueous alkaline zinc/air batteries are commercially available in both button and larger sizes. Rechargeable zinc/air batteries are also known. Other metals, such as aluminum, magnesium, iron, lithium and calcium, can also be used as active anode materials in air cells. Types and characteristics of air cells are disclosed in chapters 13 and 38 of *Handbook of Batteries, Second Edition*, David Linden (ed.), McGraw-Hill, Inc., New York, 1995. Examples of button alkaline zinc/air cells are disclosed in U.S. Pat. No. 6,602,629 (issued Aug. 5, 2003, to Guo et al.); U.S. Pat. No. 6,551,742 (issued Apr. 22, 2003, to Huq et al.) and U.S. Pat. No. 5,721,065 (issued Feb. 24, 1998, to Collien et al.) as well as U.S. Patent Publication No. 2002/0192545 (by Ramaswami et al., published Dec. 19, 2002), all of which are hereby incorporated by reference. Examples of larger cylindrical alkaline zinc/air cells are disclosed in U.S. Pat. No. 6,461,761 (issued Oct. 8, 2002, to Moy et al. and U.S. Pat. No. 5,518,834 (issued May 21, 1996, to Yoshizawa et al.), and in U.S. Patent Publication No. 2002/0160251 (by Chang et al., published Oct. 31, 2002), all of which are hereby incorporated by reference.

Air-assisted cells are hybrid cells that contain cathodes that are consumed during discharge. Air-assisted cells can have an air electrode that also contains a significant amount of an active material, such as manganese dioxide, as disclosed in *Handbook of Batteries, Second Edition*, pages 38.10-38.12. At high discharge rates that cannot be sustained by the air electrode, the manganese dioxide functions as the active cathode material, and at low rates oxygen is the primary cathode active material. The manganese dioxide is partially regenerated by air oxidation at low rates and during periods of rest. Alternatively, air-assisted cells can have a cathode containing a consumable active material that is reoxidized, or recharged, by a separate air electrode when the cell is not being discharged or is being discharged at a sufficiently low rate. Examples of air-assisted alkaline zinc cells are disclosed in U.S. Pat. No. 6,383,674 (issued May 7, 2002, to Urry); U.S. Pat. No. 5,270,128 (issued Dec. 14, 1993, to Reichert et al.); U.S. Pat. No. 5,229,223 (issued Jul. 10, 1993, to Hyland) and U.S. Pat. No. 5,079,106 (issued Jan. 7, 1992 to Urry), all of which are hereby incorporated by reference.

The housings of air and air-assisted cells are generally not hermetically sealed, in order to provide a passageway for air from outside the cell to enter the cell so it can reach the oxygen reduction electrode. One or more air inlets can be provided for this purpose. An air inlet can be in the form of an aperture, a high permeability member, a tube or other type of passageway for air to enter the cell through the cell housing. A disadvantage of air and air-assisted cells is that electrolyte can leak through the air inlets due to, for example, manufacturing defects, failure of an internal seal and excessive internal pressure. The potential for leakage becomes greater when the potential for gas generation within the cell is greater, such as in alkaline cells with a zinc anode active material and little or no added mercury.

Previous attempts have been made to reduce or eliminate electrolyte leakage through the air inlets, but none of these has proven completely satisfactory. General approaches that have been used include: forming a more effective seal at the periphery of the air electrode, using more hydrophobic materials for the hydrophobic layer on the "air" (air entry) side of the air electrode, using purer electrode materials, plating anode current collectors or using additives that will reduce the rate or amount of gas generated inside the cell, better containing within the cell electrolyte that gets to the air side of the air electrode and providing a larger void space within the anode-containing portion of the cell to better accommodate increasing material volume, condensed water vapor from outside the cell and gas generated within the cell.

In U.S. Reissue Pat. No. Re. 31,413 (issued Oct. 11, 1983), Jaggard discloses a button type gas depolarized cell in which the insulator (gasket) is held in pressure contact against the peripheral portion of the cathode assembly to form an electrolyte seal to keep electrolyte from moving around the peripheral edge of the air electrode and into the area between the hydrophobic member and the inside surface of the can bottom. Jaggard also discloses the use of a blotter placed on the gas access side of the hydrophobic layer to act as an absorber for any electrolyte which may leak from the cell under extreme environmental conditions.

In U.S. Pat. No. 6,558,828 (issued May 6, 2003), Guo discloses an button alkaline zinc-air cell having a hydrophobic layer porosity controlled during lamination to the air electrode mixture to reduce water transmission both into and out of the cell, thereby improving cell performance in high and low humidity environments. Reducing the amount of water that enters the cell also reduces the buildup of internal pressure that can lead to cell bulging and leakage.

In U.S. Pat. No. 5,279,905 (issued Jan. 18, 1994) and U.S. Pat. No. 5,306,580 (issued Apr. 26, 1994), Mansfield Jr. et al. disclose an alkaline zinc/air button cell with little or no added mercury. The anode cup is made from a triclad material with a layer of copper on the inside surface and indium electroplated over the copper to reduce hydrogen gassing.

In U.S. Pat. No. 6,602,629 (issued Aug. 5, 2003), Guo et al. disclose an alkaline zinc/air button cell with no added mercury that is resistant to leakage and salting. A low-gassing zinc composition, containing a zinc-lead alloy with low levels of contaminants, is used, together with an inorganic gassing inhibitor (In(OH)$_3$) added to the anode and zinc oxide and an organic surfactant (perfluoroalkyl polyethylene oxide) added to the electrolyte to reduce hydrogen gassing. The cell also has a copper-clad anode cup with no non-*in situ*-deposited metal with a hydrogen overvoltage higher than that of copper in the seal area to provide a smooth surface to minimize electrolyte capillary action through the gasket-anode cup interface to the outside of the cell.

U.S. Pat. No. 4,500,614 (issued Feb. 19, 1985, to Nagamine et al.) discloses the use of zinc alloyed with at least two of gallium, indium and thallium to minimize gassing in order to reduce the amount of mercury.

In U.S. Pat. No. 4,369,568 (issued Jan. 25, 1983), Dopp discloses the use of a void space between the anode cup and the anode material that is sufficient to accommodate all of the expanded anode material.

Unexamined Japanese Patent Publication No. 06-349,529 A (published Dec. 22, 1994), discloses a zinc/air button cell with acrylic fiber material between the air electrode and air access holes in the can to absorb electrolyte entering the area between the air electrode and the can and prevent leakage through the air holes.

Chinese Patent Publication No. 1,366,356 A (published Aug. 28, 2002), discloses a zinc-air battery with a water-absorbing resin layer within the container to absorb electrolyte so it will not leak outside the container.

Previous attempts to reduce or eliminate electrolyte leakage through the air inlets of air-depolarized and air-assisted cells have suffered from one or more problems. They may not eliminate the possibility of electrolyte passing around or through the air electrode, may not prevent excessive pressure from building up inside the cell, may significantly limit the high rate discharge capability of the cell, may reduce the amount of active material in a cell with limited volume and may not completely contain electrolyte that gets past the air electrode. Similar problems can exist in button type alkaline zinc/air cells as well as other types, sizes and shapes of air-depolarized and air-assisted cells.

In view of the above, an object of the present invention is to provide a cell with an oxygen reduction electrode having improved resistance to electrolyte leakage, as well as a high discharge capacity and good high rate discharge characteristics. A further object of the invention is to provide a cell with an oxygen reduction electrode that has improved electrolyte leakage characteristics and can be easily manufactured on high-volume, high-speed equipment at a reasonable cost.

SUMMARY

The above objects are met and the above disadvantages of the prior art are overcome by providing a non-hermetically sealed cell with a component, disposed between the oxygen reduction electrode and a wall of the cell housing with one or more air inlets therethrough, that can be transformed by contact with the cell electrolyte to form a seal within the cell that will reduce or prevent leakage of electrolyte through the air inlet(s). The transformable sealing component will initially allow air to pass therethrough or thereby to the oxygen reduction electrode.

Accordingly, one aspect of the present invention is an electrochemical battery cell comprising a non-hermetically sealed housing comprising a first wall having at least one air inlet; an oxygen reduction electrode disposed within the housing and comprising an oxygen reduction layer and an electrolyte impermeable layer, the electrolyte impermeable layer being disposed between the oxygen reduction layer and the first wall of the container; an electrolyte disposed within the housing; and a transformable component disposed between the housing wall having the at least one air inlet and the oxygen reduction electrode. The transformable component is disposed between the oxygen reduction electrode and the housing wall having the at least one air inlet, and the transformable component, when contacted by the electrolyte, is capable of transformation to an electrolyte sealing component.

Another aspect of the present invention is an electrochemical battery cell comprising a non-hermetically sealed housing comprising a first wall having at least one air inlet, an oxygen reduction electrode disposed within the housing, an electrolyte disposed within the housing and an initially air permeable component disposed between the oxygen reduction electrode and the first wall of the housing. The initially air permeable component comprises a material that, when contacted by the electrolyte, is capable of transforming the initially air permeable component into an electrolyte sealing component.

Yet another aspect of the invention is an electrochemical battery cell comprising a non-hermetically sealed housing comprising a first wall having at least one air inlet, an oxygen reduction electrode disposed within the housing and comprising an oxygen reduction layer and an electrolyte impermeable layer, the electrolyte impermeable layer being disposed between the oxygen reduction layer and the first wall of the container, an electrolyte disposed within the housing and a transformable component comprising a base material comprising pores disposed between the housing wall having the at least one air inlet and the oxygen reduction electrode. The transformable component comprises a surface facing the oxygen reduction electrode, a pressure applied to that surface is capable of transforming the transformable component to an electrolyte sealing component, and the transformation comprises at least a partial collapse of the pores.

These and other features, advantages and objects of the present invention will be further understood and appreciated by those skilled in the art by reference to the following specification, claims and appended drawings.

Unless otherwise specified, as used herein the terms listed below are defined as follows:

button cell is a round electrochemical battery cell having an overall height that is less than its diameter, as defined by the American National Standards Institute, Inc. in ANSI C18.1, Part 1;

electrolyte seal is a partial or complete blockage to retard or prevent the passage of electrolyte;

initially air permeable is air permeable as manufactured and during cell use before contact with a cell electrolyte;

porosity is the percentage of the total volume of a porous article that is contained by the pores and can be calculated from the observed density (measured mass/volume) of the article and the real density of the material from which the article is made using the formula: porosity=100% (1−(observed density)/(real density)); and through-pore is a pore forming an uninterrupted path from one external surface to an opposite external surface, e.g., of a sheet of material.

Unless otherwise specified herein, all disclosed characteristics and ranges are as determined at room temperature (20-25° C.).

DESCRIPTION

Figure 1:
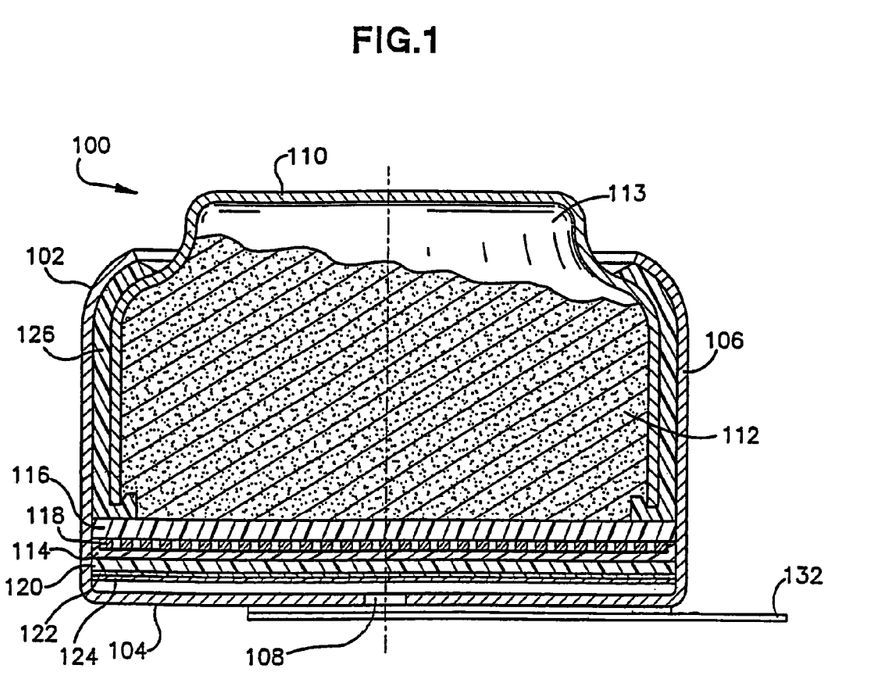
FIG. 1 is a conventional button type alkaline zinc-air cell.

The invention will be better understood by reference to FIG. 1, which shows a conventional button type cylindrical alkaline zinc-air cell. Terms such as top, bottom, above, below, vertical, horizontal and so forth refer to the cell in the orientation shown in FIG. 1. Cell 100 includes a conductive metal cathode can 102, which also serves as the positive terminal of the cell. The can 102 has a bottom wall 104 surrounded by a vertical wall 106. An air inlet 108 is located in the bottom 104 of cathode can 102. The cell 100 also includes a conductive metal anode cup 110, which serves as the negative terminal of the cell. A seal member (gasket) 126, which is generally made of an elastomeric polymer, provides electrical insulation and a compressive seal between the anode cup 110 and the cathode can 102. The cathode can 102, anode cup 110 and gasket 126 together make up the cell housing.

Each of the anode cup 110 and the cathode can 102 can be a single layer of metal, a bilaminate, or a multiple metal layer laminate. Typical metals that are used for the anode cup 110 and cathode can 102 include, for example, nickel, stainless steel and copper. The anode cup 110 is often made of a tri-clad material that includes layers of copper, stainless steel and nickel, from the interior to the exterior, respectively, of the anode cup 110. The cathode can 102 is often made of nickel plated steel or nickel plated stainless steel.

A negative electrode (anode) mixture 112 is contained within the interior of the cell 100. The anode mixture 112 of the zinc-air cell includes particulate zinc, an alkaline electrolyte, such as potassium hydroxide (KOH), and a gelling agent, such as an acrylic acid polymer. Additives such as indium hydroxide ($In(OH)_3$), zinc oxide (ZnO) and polyethylene glycol can be included to minimize hydrogen gas generation. Examples of suitable anode mixture compositions in zinc-air cells containing no added mercury are disclosed in U.S. Pat. No. 6,602,629. The amount of anode mixture 112 that is placed in the zinc-air cell 100 is generally less than the available volume so an air pocket 113 is present to accommodate reaction products, including hydrogen gas.

The zinc-air cell 100 further includes an oxygen reduction (air) electrode 114 positioned below and electrically insulated from the anode mixture 112 by one or more layers of an ionically conductive separator 116. The air electrode 114 may be any suitable material suitable for reducing oxygen, which serves as the positive electrode active material. For example, the air electrode mixture can include carbon, manganese oxide ($MnO_x$) and a binder such as tetrafluoroethylene (TFE). A metal screen 118, which can be made from nickel, is embedded within the air electrode mixture to serve as a current collector to improve electrical conductivity within the air electrode 114 and provide good electrical contact between the air electrode 114 and the cathode can 102. The air electrode 114 includes a hydrophobic membrane 120, which can be made of a microporous polymeric membrane, such as a polytetrafluoroethylene (PTFE), that is air permeable but impermeable to electrolyte during normal storage and use. The hydrophobic membrane 120 can be laminated on the bottom (air) side of the air electrode mixture, facing the bottom wall 104, to provide a gas-permeable, waterproof boundary to retain the electrolyte within the cell 100.

The cell can also include an air diffusion membrane 122 to regulate gas diffusion rates and an air distribution membrane 124 to distribute air evenly to the air electrode 114. The air diffusion membrane 122 can be made of PTFE, and the air distribution membrane can be made of porous material, such as paper, spun-bonded polypropylene, spun nylon and the like.

A tab 130 covers the air inlet 108 before the cell is used. The tab 130 can include two laminated polymer layers and an adhesive layer to secure the tab to the can bottom 104. When the cell 100 is ready for use, the user activates it by peeling the tab 130 away from the cell 100 to expose the air inlet 108 an allow air to enter the cell 100. The tab composition is selected to allow only a minimal amount of oxygen into the cell in order to maintain a desired open circuit voltage, so the cell can be quickly activated, while minimizing consumption of the zinc in the anode before the cell is used.

For purposes of convenience, example embodiments of the present invention are generally described with respect to an exemplary button-type alkaline zinc-air cell 100. However, one skilled in the art can appreciate that embodiments of the present invention can also be described with respect to other metal-air and air-assisted cells, including cells with other anode, cathode and electrolyte compositions and having other sizes and shapes. Other air inlet configurations can also be used in embodiments of the invention. The button cell in FIG. 1 has only a single round air inlet in the bottom wall of the cathode can, but a plurality of air inlets of any suitable size and shape can be used. Multiple air inlets can be disposed in a single wall of the housing, or one or more of the air inlets can be disposed in another housing wall. When there are multiple air inlets, one or more transformable components may be disposed between the oxygen reduction electrode and all of the air inlets. In some embodiments an air inlet can be disposed at an edge of a housing wall, between that wall and another wall or housing component. Components and materials known or determined to be suitable for conventional cell types with oxygen reduction electrodes can be used in the present invention.

In a button type alkaline zinc-air cell, the air electrode can comprise any suitable air reduction material, such as carbon and/or manganese oxides ($MnO_x$). Binders, such as fluorinated hydrocarbons (e.g., tetrafluoroethylene, TFE) can also be used, in which cases small amounts of surfactants may also be present in the electrode. The mixture can be formed into a sheet of desired thickness and density by a suitable process, such as calendering. A current collector, e.g., a metal screen or expanded metal, can be embedded into one side of the sheet, using one or more sets or rollers, for example. A sheet of a microporous, hydrophobic film, such as a PTFE film, can be laminated to the other side of the air electrode mixture as the hydrophobic layer, using pressure applied by rollers, for example, to produce the air electrode. Optionally, a liquid TFE can be applied to the PTFE film or the air electrode sheet to improve adhesion of the hydrophobic layer. Other suitable materials may be used for the hydrophobic layer, such as air permeable polyolefins and fluoropolymers, including fluorosilicone polymers, polyorganosiloxanes, polyethylene and polypropylene. The hydrophobic film can also be impregnated or coated with other materials to modify their performance. One or more layers of suitable separator material, such as a microporous polypropylene film, can be applied to the side of the air electrode opposite the hydrophobic layer.

This can be done with a suitable adhesive, such as a polyvinyl alcohol. Electrode discs can then be punched or cut from the air electrode-separator sheet.

In one embodiment of a button type alkaline zinc-air cell, the thickness of the air electrode (excluding the separator) can be from about 0.025 cm (0.010 inch) to about 0.033 cm (0.013 inch), with a density of about 15 g/cm$^3$, including the embedded current collector.

The present invention can be adapted to a cell such as that shown in FIG. 1 to provide a seal within the cell, for reducing or preventing electrolyte leakage from the cell through the air inlet if electrolyte passes through or around the hydrophobic membrane (e.g., due to high internal pressure within the cell or a manufacturing defect). The internal seal can be formed when a transformable component, disposed within the cell, e.g., between the air electrode and the air inlet, is contacted by electrolyte. Initially the transformable component is air permeable or is configured to allow air to bypass it during normal cell use, but when electrolyte comes in contact with this component, it is transformed in such a way as to create an electrolyte seal between the oxygen reduction electrode and the air inlet (i.e., to at least partially block electrolyte that has passed through or around the oxygen reduction electrode from reaching and leaking through the air inlet). In some embodiments of the invention, the addition of a transformable component to a cell will not reduce the rate of oxygen ingress into the air electrode under normal conditions. However, in other embodiments the transformed sealing component may reduce the air permeability, in which case the rate of gas generating reactions in the cell that can force electrolyte through or around the oxygen reduction electrode may also be advantageously reduced.

In some embodiments of the invention the transformable component can be a separate component added to the cell, while in other embodiments it can also function as a conventional cell component, such as an air diffusion membrane or an air distribution membrane. In some embodiments, such as those in which the transformable component serves as an air diffusion membrane or air distribution membrane, the transformable component can be in the form of a relatively large area sheet to cover a substantial portion of the exposed air side surface of the air electrode or the air diffusion membrane, respectively. In other embodiments, such as those in which the transformable component is a separate component, the transformable component can also be in the form of a relatively large area sheet disposed between the air electrode and the air diffusion membrane, between the air diffusion membrane and the air distribution membrane or between the air distribution membrane and the inside surface of the can bottom. Alternatively, the transformable component can have a smaller area, e.g., covering the air inlet and only a portion of the internal surface of the can bottom surrounding the air inlet. The transformable component can be a material applied to the inner surface of the can or a portion thereof, particularly the surface disposed on the air side of the air electrode, such as all or a portion of the can bottom. In yet other embodiments the transformable component can have other sizes and shapes, or the cell can have more than one transformable component, depending on the size, shape and design of the cell and the size, location and number of air inlets.

The transformable component can be transformed to form an electrolyte seal in any suitable manner. The transformable component can contain a transformable material that can undergo a physical or chemical change when it comes in contact with the cell electrolyte. This material can be the base material of the component, or it can be added to a base material, e.g., as a filler, an external coating or a filling within or coating on the surfaces of pores within the base material. The transformable material can be any material that can undergo a physical or chemical change upon contact with the cell electrolyte to create an electrolyte seal. Examples of such changes include solidification, swelling and becoming adhesive.

In some embodiments the transformable component can swell as a result of contact with the electrolyte. For example, the component can swell and move toward the internal surface of the can bottom, forming an electrolyte seal against the internal surface of the can surrounding the air inlet(s) or forcing another internal cell component, such as an electrolyte impermeable film or portion thereof, against the internal surface of the can, so the other component seals electrolyte from the air inlet(s). In another example, swelling of the material of the transformable component can cause pores in the transformable component to collapse, making the component substantially electrolyte impermeable. In yet another example, swelling of a material contained within pores of the transformable component can cause the pores to become more fully filled to block the passage of electrolyte through the component.

Examples of materials that swell when they come in contact with an aqueous KOH electrolyte include cross-linked polyacrylate polymers, starch-grafted polyacrylate polymer super-absorbents, and compressed cellulose sponges. Some of these materials can absorb many times their weight in electrolyte, and some can increase in thickness by a factor of two or more. Some absorbent materials can be loaded on cellulose paper or other suitable base materials. Others can be in the form of a free-standing material, such a sheet or membrane that does not have to be applied to a separate base material. Properties of some of these types of materials are found in Example 1 below.

A transformable component can undergo other types of change besides swelling. For example, polyvinyl alcohol (PVA), in addition to swelling, can become hard and impermeable to liquid when it comes in contact with a strongly basic electrolyte. PVA can be added to a base material (e.g., as a surface coating or contained within pores of the base material) to form a transformable component.

An example of another material that can be used to make a transformable component is a polyamide resin. Polyamide resins can be very cohesive. When such a resin is loaded into a porous base film, compression of the film can cause the pores to collapse so that resin coating the pores tends to glue the pores closed. A polyamide resin can be added to a base material for use as an air diffusion layer, for example. This can be done using any suitable method, such as by soaking the base material (e.g., a PTFE film) in a solution of polyamide resin dissolved in a solvent. The solvent chosen will depend upon the resin and the base material, and the concentration of resin in the solvent can be adjusted to optimize the time and completeness of loading of resin into the base material. It may be desirable to support the base material, e.g., with some type of frame, during the loading process, to protect the base material from damage or distortion or to facilitate processing.

The amount of resin used should be sufficient to improve leakage resistance in the cell but not so much as to reduce the electrical performance of the cell to an unacceptable level. In some embodiments, such as those in which the cell is a button zinc-air cell with an air diffusion layer made from PTFE film with a porosity of up to about 60 percent, a polyamide resin loading of less than 305 mg/cm$^3$ may be desirable. A loading of at least 110 mg/cm$^3$ may desired to achieve improved cell leakage resistance, and a loading of 174 mg/cm$^3$ or more can improve leakage resistance further with little effect on oxygen diffusion and cell discharge capacity. A maximum of about 295 mg/cm³ may be preferred for better discharge capacity in some applications. The maximum level of loading may be further limited with base materials that are less porous and may be higher with base materials that are more porous.

The transformable component can be transformed by a combination of changes, such as swelling of the component and another physical or chemical change in the component. For example, the component may swell, at least partially collapsing pores within the component, and the pores of the component may be at least partially filled or coated with a material that, when it comes in contact with electrolyte from the cell, becomes an adhesive that more effectively closes the pores of the transformable component. In another example, a transformable component that swells against the internal surface of the can wall can be coated with a material that becomes an adhesive when contacted by electrolyte to adhere the sealing component to the can wall.

The transformable component can have additional properties that may help reduce or prevent electrolyte leakage through the air inlet(s) of the cell. For example, the transformable component can absorb some electrolyte, retaining it so that it does not reach the air inlet(s).

The transformable component can also have additional properties that mitigate the effects of any electrolyte that does reach or leak through the air inlet(s). For example, the transformable component can be coated with or contain a material that can react with an electrolyte to make it less damaging, such as by neutralizing an aqueous KOH electrolyte. Examples of such electrolyte modifying materials include materials that can neutralize the electrolyte solution, such as citric acid, and materials that can act as a pH buffer, such as boric acid. Crystals of citric acid and/or boric acid can added to a porous base material, e.g., in the dry form or as a solution followed by solvent removal (such as by evaporation).

In general, the maximum amount of electrolyte modifying material needed can be determined based on the amount of electrolyte in the cell and the electrolyte solute concentration. However, some electrolyte will generally be retained within a leaking cell, and the amount of electrolyte modifying material used in the cell may also be limited by the internal cell volume that is provided.

When citric acid is used in a cell with 33 weight percent KOH electrolyte, a ratio of about 0.20:1 citric acid to electrolyte by weight is sufficient to neutralize all of the electrolyte in the cell. A ratio of at least about 0.01:1 citric acid to electrolyte is desirable to achieve a desired level of leakage reduction. Using at least about 0.03:1 citric acid to electrolyte is desired can provide further leakage reduction. Due to volume considerations, a maximum of about 0.05:1 citric acid to electrolyte may be desired in some embodiments.

When boric acid is used, about three times the weight equivalence of boric acid is needed to bring the pH of the electrolyte to about 10. A ratio of at least about 0.05:1 boric acid to electrolyte by weight is generally desirable, preferably at least about 0.15:1. A ratio greater than about 1.10:1 generally provides little additional benefit, and it may be desirable to use no more than 0.25:1 boric acid to electrolyte due to volume limitations within the cell.

The invention is further illustrated in the following Examples.

EXAMPLE 1

Samples of a total of more than twenty absorbent materials from five sources were tested to evaluate their absorbent and oxygen diffusion properties. Properties of several of those materials are summarized in Table 1. Some of the materials were also tested after compressing to an initial test thickness. Material descriptions, sources and conditions are included in Table 1 below.

Specimens of each material were prepared by cutting each to a convenient size. Some were compressed using a roller mill, and pin holes, spaced about 1 mm apart, were made in some, as indicated in Table 1.

The materials were evaluated for three characteristics: swelling, KOH solution absorption and oxygen diffusion. Swelling and KOH solution absorption were determined using a soak test, and oxygen diffusion was evaluated using an oxygen diffusion half-cell test, a type of limiting current test. The test methods are described below.

Soak Test:
1. The dimensions of each specimen were measured; thicknesses were measured using a snap gauge with a 9.9 mm (0.39 inch) diameter flat tip and approximately 80 grams of force.
2. Each specimen was also weighed to the nearest 0.0001 gram using a digital scale. Four specimens of each material were tested on each test and the results averaged.
3. Each specimen was soaked in 8.6 micrograms of KOH solution (33 weight percent KOH in water) per milligram of specimen weight for two minutes.
4. Each specimen was removed from the KOH solution, excess liquid blotted from the surface of the specimen, the specimen was reweighed and the thickness remeasured.
5. The percent increase in thickness of each specimen was determined by dividing the thickness after soaking by the thickness before soaking, then multiplying by 100 percent. The results were averaged for each material type and condition.
6. The amount of KOH solution absorbed by each specimen was determined by subtracting the weight before soaking from the weight after soaking, dividing by the surface area, dividing by (actual initial thickness/0.254 mm) to normalize to a thickness of 0.254 mm (0.010 inch), and multiplying by 100 percent. The results were averaged for each material type and condition.
7. The amount of KOH solution absorbed was determined for each specimen by subtracting the weight before soaking from the weight after soaking, dividing by the specimen weight before soaking and dividing by the surface area of that specimen.

Oxygen Diffusion Half-Cell Test
1. Air electrodes for the Oxygen Diffusion Test were prepared. An air electrode mixture of 64 weight percent activated carbon (DARCO G-60, available from American NORIT Americas Inc., Marshall, Tex., USA), 19 weight percent MnO and 14 weight percent tetrafluoroethylene. A metal screen (40 by 40 mesh, 0.127 mm (0.005 inch) diameter nickel wires) was embedded into one side of the sheet and pressure laminating a 0.102 cm (0.004 inch) thick sheet of PTFE film (from Saint-Gobain Performance Plastics) onto the opposite side to produce an air electrode sheet. A sheet of 0.025 mm (0.001 inch) thick CELGARD® 5550 polypropylene separator (from Celgard Inc., Charlotte, N.C., USA) was applied to the surface of the air electrode sheet opposite the hydrophobic layer using an adhesive comprising PVA and carboxymethylcellulose, to form a 0.38 mm (0.014 inch) thick air electrode-separator sheet. Individual electrodes were cut from the air electrode-separator sheet.
2. For each absorbent material specimen tested an individual air electrode was loaded into a half-cell test fixture with an air access port, with the hydrophobic layer of the air electrode against the air access port and the separator layer adjacent to an electrolyte chamber, which contained a zinc reference electrode in a Luggin-Harer type capillary tube. The test fixture was filled with a 33 weight percent aqueous KOH electrolyte solution and then sealed. An Oxygen Diffusion Half-Cell Test was performed on the half-cell, containing no absorbent material specimen, according to the method described below. The electrolyte was then drained from the test fixture, the fixture opened, a test specimen, cut to the proper size, loaded into the test fixture between the previously used air electrode and the air inlet, the fixture sealed, the electrolyte chamber filled with electrolyte solution and the Oxygen Diffusion Half-Cell Test performed on the half-cell containing the test specimen.

3. A potentiostat electrically connected to the air electrode was held at 0.7 volt versus the reference electrode for at least two minutes to obtain a stable current reading, which was recorded.

The average results from the Soak Test (thickness increase and KOH absorption) and the Oxygen Diffusion Half-Cell Test (reduction in oxygen diffusion) are shown in Table 1. The oxygen diffusion reduction values are percentages, compared to the oxygen diffusion test results for half-cells without an absorbent material test specimen. Two sets of Gelok No. 7026-64 A/A uncompressed specimens were tested on the Soak test, and the averages for both sets are shown; only one set of specimens was tested on the Oxygen Diffusion Half-Cell Test.

TABLE 1

| Material Description | Material Source | Initial Thickness | Thickness Increase (% of initial) | KOH Absorption (mg/cm$^2$) | Reduction in O$_2$ Diffusion (%) |
|---|---|---|---|---|---|
| F-13 regenerated cellulose sponge, as received | 3M, St. Paul, Minnesota, USA | 1.143 mm (0.045 in.) | 789 | 1078 | 39 |
| F-13 regenerated cellulose sponge, compressed | 3M, St. Paul, Minnesota, USA | 0.965 mm (0.038 in.) | 995 | 1041 | 69 |
| F-13 regenerated cellulose sponge, compressed, with pinholes | 3M, St. Paul, Minnesota, USA | 0.635 mm (0.025 in.) | 948 | 792 | 29 |
| No. 7026-64 A/A cross-linked polyacrylate superabsorbent polymer, uncompressed | Gelok International Corp., Dunbridge, Ohio, USA | 0.787, 0.762 mm (0.031, 0.030 in.) | 126, 150 | 232, 274 | 5.8 |
| No. 7026-64 A/A cross-linked polyacrylate superabsorbent polymer, compressed | Gelok International Corp., Dunbridge, Ohio, USA | 0.254 mm (0.010 in.) | 620 | 348 | 11 |
| No. 6026-33 A/A cross-linked polyacrylate superabsorbent polymer, uncompressed | Gelok International Corp., Dunbridge, Ohio, USA | 0.559 mm (0.022 in.) | 77 | 119 | 4.4 |
| No. 5025-33 A/A cross-linked polyacrylate superabsorbent polymer, uncompressed | Gelok International Corp., Dunbridge, Ohio, USA | 0.559 mm (0.022 in.) | 64 | 112 | 2.6 |
| No. 5025 A/S cross-linked polyacrylate superabsorbent polymer, uncompressed | Gelok International Corp., Dunbridge, Ohio, USA | 0.432 mm (0.017 in.) | 29 | 83.7 | 3.3 |
| No. 5540 S/E cross-linked polyacrylate superabsorbent polymer, uncompressed | Gelok International Corp., Dunbridge, Ohio, USA | 0.356 mm (0.014 in.) | 14 | 63 | 88 |

EXAMPLE 2

The potential benefits of adding an acid to an absorbent pad (e.g., one that could be used as an internal air diffusion layer or an additional absorbent layer) to neutralize a zinc/air cell with KOH electrolyte were evaluated by determining the effect on pH of adding various amounts of two acids, citric acid and boric acid, to a 33 weight percent KOH solution, using the following procedure for each of the two acids.

1. A small amount (e.g., about 1-2 grams) of 33 weight percent KOH solution was poured into a pre-weighed weighing boat.
2. The weighing boat and electrolyte were weighted and the pH of the solution was measured.
3. A small piece of blotter paper (e.g., about 4 cm$^2$) was weighed, dipped into the solution, removed and placed in a preweighed weighing boat; the weighing boat and blotter paper were weighed to determine the weight of solution on the blotter paper. The weighing boat and blotter paper were held for further testing (step 9).
4. A small (e.g., about 0.1 g) amount of crystalline acid was stirred into the KOH solution from step 2; the adjusted weight and pH of the solution were determined.
5. Step 3 was repeated with another piece of blotter paper and the adjusted KOH solution from step 4.
6. Steps 4 and 5 were repeated with additional pieces of blotter paper after further acid additions to the KOH solution until the pH of the solution was about 7.
7. The resultant pH of the KOH solution was plotted as a function of the total weight percent of acid added (see FIG. 2).
8. All of the weighing boats with blotter paper samples from steps 2, 5 and 6 were placed in plastic dishes and floated on water in a sealed container; each of the weighing boats was reweighed daily for five days.
9. The rate of weight gain, in mg/cm$^2$/hr, was determined from the results in step 8 and plotted as a function of the pH of the KOH solution (see FIG. 3).

Figure 2:
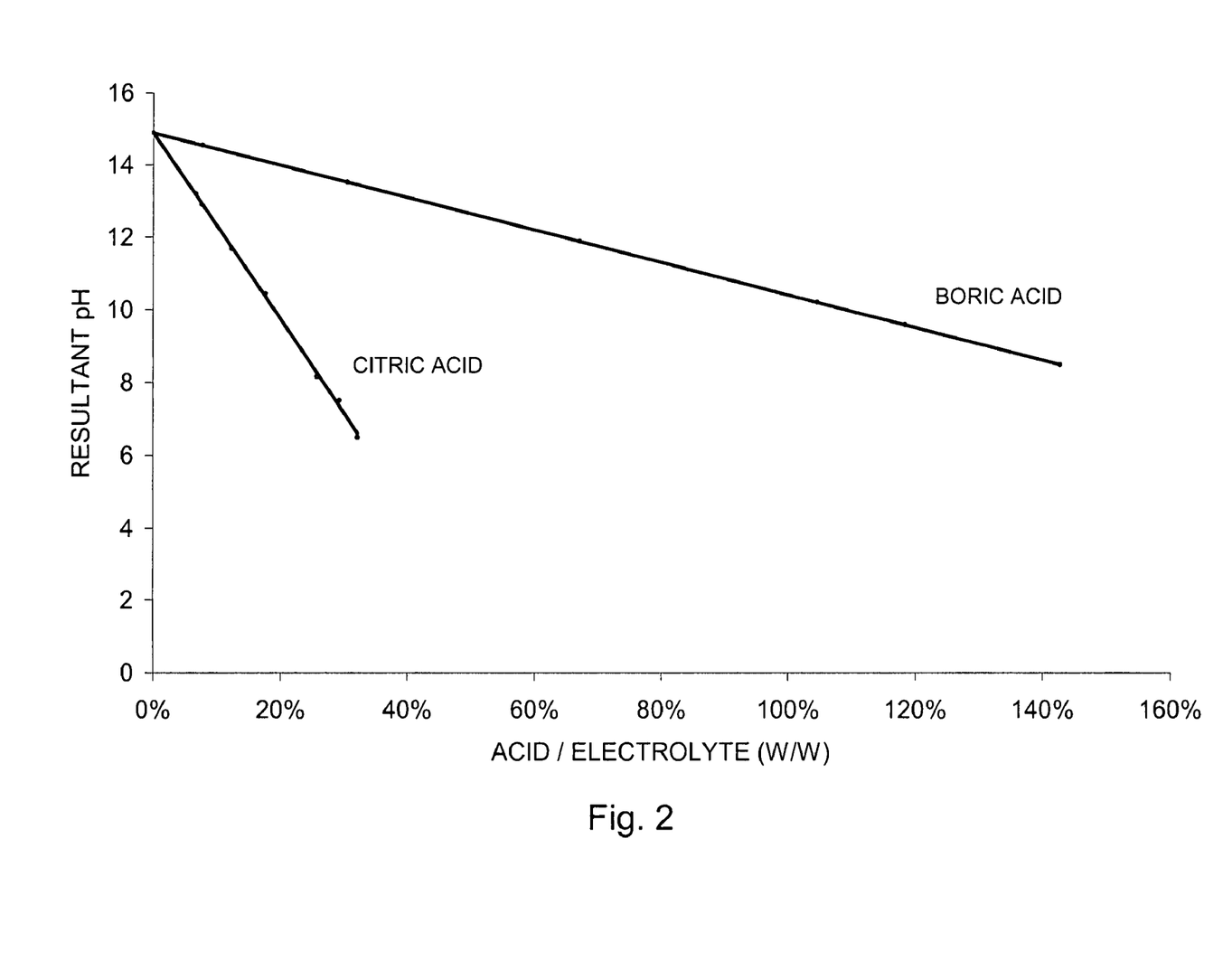
FIG. 2 is a graph of solution pH as a function of the amount of acid added (weight as percent of original KOH solution weight) to a 33 weight percent solution of KOH in water.

FIG. 2 shows that citric acid is about 5 times more effective than boric acid in neutralizing an aqueous KOH solution and that the addition of about 20 weight percent citric acid (based on the amount of 33 weight percent KOH solution) is sufficient to reduce the pH of the solution to about 10.

Figure 3:
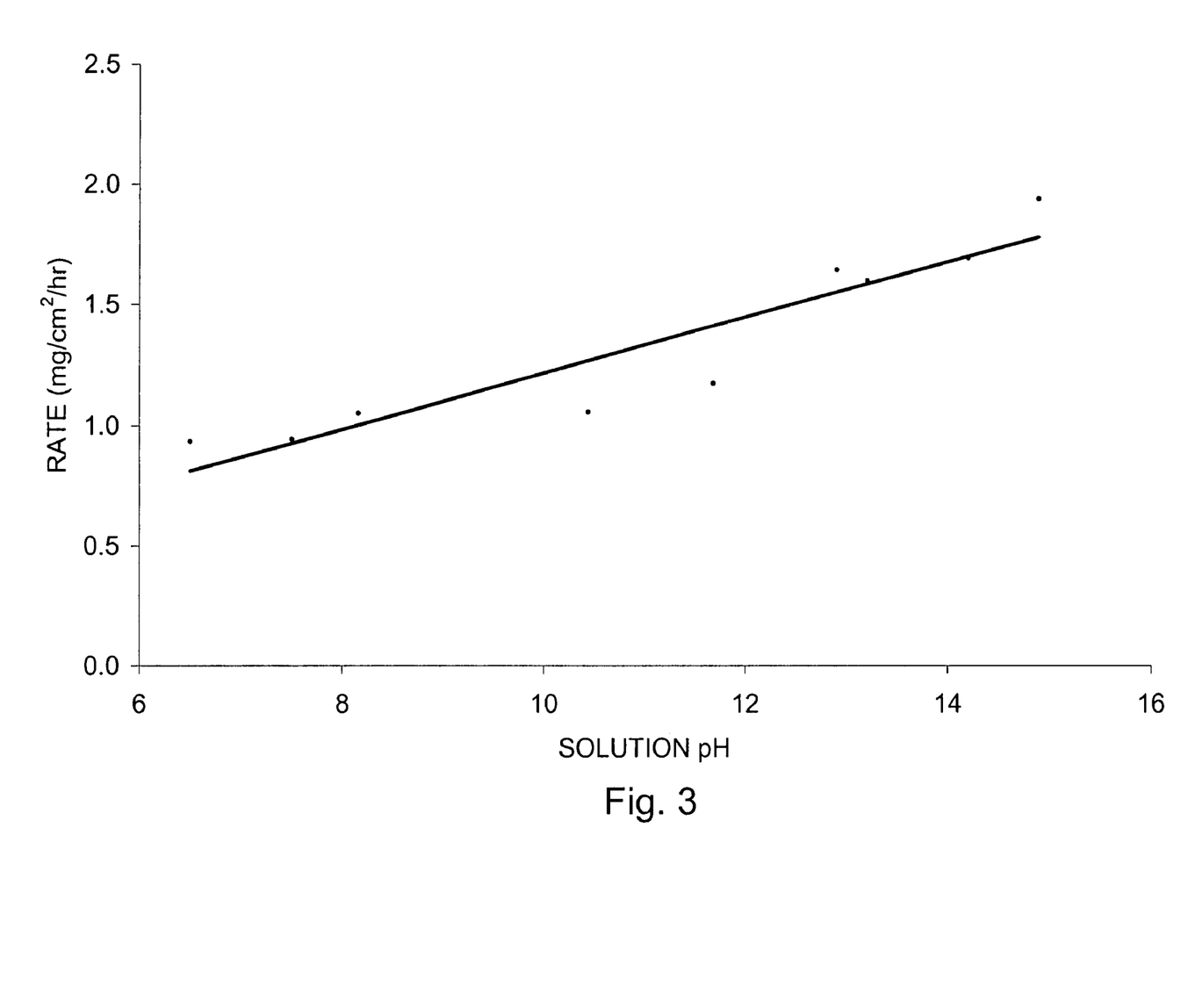
FIG. 3 is a graph of the rate of weight gain (mg per cm$^2$ of surface area per hour) for blotter paper specimens soaked with partially neutralized 33 weight percent KOH solution as a function of the pH of the partially neutralized solution.

FIG. 3 shows that neutralizing KOH solution reduces its hygroscopic nature in a humid environment. KOH electrolyte solution that passes through or around the air electrode in a cell will similarly gain less water if at least partially neutralized, thereby reducing the volume of electrolyte that can leak through the cell's air inlet(s), and electrolyte that does leak from the cell will be less caustic and less damaging.

EXAMPLE 3

The ability of polyvinyl alcohol (PVA) to reduce the rate at which KOH electrolyte solution soaks through an absorbent material was evaluated by comparing the time required for a 33 weight percent KOH solution to soak through a paper towel.

Three different types of PVA were tested: grades 70-62, 52-22 and 50-42 from E.I. duPont de Nemours & Co., Wilmington, Del., USA. A solution of 10 weight percent PVA in water was prepared from each of the PVA materials by dissolving about 10 weight percent crystalline PVA in cold water slowly heating to boiling while gently stirring and, after boiling for about five minutes, cooling the solution to room temperature under a partial vacuum while continuously stirring. Each solution was applied to a sheet of paper towel by first soaking the towel in the liquid and then squeegeeing the soaked towel to its original thickness.

The times required for the KOH solution to soak through each of the sheets of coated paper towels, as well as a sheet of uncoated paper towel, were determined by placing a strip of pH indicator paper in a shallow dish, placing a small piece of the treated paper towel sheet over the pH paper, dispensing 1200 mg of 33 weight percent KOH solution per cm$^2$ of paper towel onto the paper towel and measuring the time required for the solution to soak through the paper towel and change the color of the pH paper.

The average soak-through times of the coated and uncoated paper towel sheets are shown in Table 2 (3 test samples for each paper towel sheet).

TABLE 2

| Coating on Paper Towel | Soak-Through Time (seconds) |
| --- | --- |
| none | 9 |
| 70-62 PVA | 60 |
| 52-22 PVA | 570 |
| 50-42 PVA | 420 |

It was observed that air flow did not appear to be substantially decreased by PVA-treatment of the paper towel sheets. It was also observed that the 10 weight percent PVA solutions were stable at room temperature, with little or no observable biodegradion. However, 5 percent PVA solutions may be more easily handled in some application processes because they are not as viscous.

EXAMPLE 4

Testing was done to evaluate the combination of electrolyte blocking effects of duPont 52-22 grade PVA and the electrolyte neutralizing effects of citric acid when applied to paper of the type used as an air distribution layer in conventional button alkaline zinc/air cells.

The air distribution layer base material used was 0.10 mm (0.004 inch) thick bleached kraft paper.

The air distribution layer base material was loaded with citric acid by dipping the paper into a 60 weight percent (1.12 g/cc) solution of citric acid in methanol, allowing excess solution to run off the paper and then air drying.

The air distribution layer base material was loaded with PVA by dipping the paper into a 10 weight percent solution of duPont 52-22 grade PVA in water, allowing excess solution to run off the paper and then air drying.

Specimens of the unloaded paper and paper loaded with PVA and citric acid (singly and in combination) were tested to determine soak-through times in the same manner as described in Example 3 for specimens made from paper towels. The results are summarized in Table 3.

TABLE 3

| Sample Description | Loading on Paper (mg/cm$^2$) | Soak-Through Time (seconds) |
| --- | --- | --- |
| Unloaded air distribution paper | none | 3.5 |
| Air distribution paper loaded with citric acid | 11 | 23 |
| Air distribution paper loaded with PVA | 2.6 | 270 |
| Air distribution paper loaded with citric acid and PVA | citric acid: 6.0<br>PVA: 3.1 | >1200 |

Litmus paper placed against the bottom surfaces of unloaded and loaded air distribution layer specimens showed that the citric acid was effective in significantly reducing the pH of KOH solution soaking through the specimens containing citric acid.

EXAMPLE 5

PR44 type button alkaline zinc-air cells were made and tested to determine the effects of incorporating selected absorbent materials into the cells on several cell characteristics.

The cells were made according to FIG. 1. The air electrodes had an electrode mixture of activated carbon, $MnO_x$ and tetrafluoroethylene with a nickel expanded metal screen embedded into one side of the sheet and a 0.102 mm (0.004 inch) thick sheet of PTFE film pressure laminated onto the opposite side. Two laminated sheets of polypropylene separator materials were applied to the surface of the air electrode sheet opposite the hydrophobic layer using a PVA adhesive to form a 0.38 mm (0.015 inch) thick air electrode-separate sheet. Individual electrodes were cut from the air electrode-separator sheet. Each cell had an air diffusion layer made from 0.102 mm (0.004 inch) thick PTFE film. Each control cell had an air distribution layer made from a sheet of 0.102 mm (0.004 inch) thick bleached kraft paper between the air diffusion layer and the bottom of the cathode can, while experimental cells had air distribution layers made from alternative materials, as described in Table 4 below.

The air distribution materials used in the Experimental lots were various grades of cross-linked polyacrylate films from Gelok International Corp., Dunbridge, Ohio, USA. The method of loading the air distribution paper with citric acid and PVA described in Example 4 was used in Lots 5, 6 and 7.

TABLE 4

| Experimental Lot | Air Distribution Layer Description |
|---|---|
| 1 | 0.787 mm (0.031 in.) thick Gelok No. 7026-64 A/A polyacrylate film, compressed to 0.010 in. (0.254 mm) |
| 2 | 0.254 mm (0.010 in.) thick Gelok No. X735 polyacrylate film, uncompressed |
| 3 | 0.254 mm (0.010 in.) thick Gelok No. X734 film, uncompressed |
| 4 | 0.381 mm (0.015 in.) thick Gelok No. X734 polyacrylate film, compressed to 0.254 mm (0.010 in.) |
| 5 | 0.381 mm (0.015 in.) thick Gelok No. X734 polyacrylate film, loaded with 0.7 wt % citric acid, compressed to 0.254 mm (0.010 in.) |
| 6 | 0.381 mm (0.015 in.) thick Gelok No. X734 polyacrylate film, loaded with 0.4 wt % PVA, compressed to 0.254 mm (0.010 in.) |
| 7 | 0.381 mm (0.015 in.) thick Gelok No. X734 polyacrylate film, loaded with 0.4 wt % citric acid and 0.3 wt % PVA, compressed to 0.254 mm (0.010 in.) |

Selected cells were tested on the following tests:
1. Oxygen Diffusion Full Cell Test. Two cells from each lot were tested. Each cell was electronically connected to a potentiostat and held at 0.7 volt for at least two minutes to obtain a stable current reading. The average current reading was recorded for each lot.
2. Capacity. The same cells tested for oxygen diffusion were discharged on a 100 ohm continuous load to 0.5 volts, monitoring the discharge voltages continuously, and the discharge capacity of each cell (in mAh) was calculated to 0.5, 0.9 and 1.0 volts by integrating the voltage/time discharge curve to those voltage end points.
3. Weight Gain. The same cells tested for oxygen diffusion and capacity were weighed, placed in a chamber at approximately 100 percent relative humidity orientated with their air holes up, observed and weighed daily until leakage was observed at the air holes.

The results of the above tests are summarized in Table 5, which shows the averages for each lot, normalized to the averages for the control cells (control=100).

TABLE 5

| Test | Control | Lot 1 | Lot 2 | Lot 3 | Lot 4 | Lot 5 | Lot 6 | Lot 7 |
|---|---|---|---|---|---|---|---|---|
| Weight Gain | 100 | 124 | 119 | 124 | 109 | 117 | 146 | 142 |
| Oxygen Diffusion | 100 | 110 | 87 | 112 | 122 | 126 | 113 | 128 |
| Capacity to 0.5 V | 100 | 84 | 84 | 95 | 87 | 95 | 91 | 99 |
| Capacity to 0.9 V | 100 | 78 | 79 | 93 | 82 | 94 | 92 | 101 |
| Capacity to 1.0 V | 100 | 74 | 78 | 92 | 78 | 96 | 96 | 103 |

EXAMPLE 6

Polyamide resin was tested to determine its suitability as a transformable material additive to convert a conventional PTFE air diffusion membrane into a transformable air diffusion layer for use in alkaline air and air assisted cells.

Two thicknesses of PTFE film were used as an air diffusion layer base material. One was 0.102 mm (0.004 inch) thick, had an observed density (measured weight/volume) of 0.905 $g/cm^3$ and a porosity ($100\% \times (1-(\text{observed density/real density}))$) of 58 percent (real density=2.16 $g/cm^3$). The other was 0.203 mm (0.008 inch) thick, had an observed density of 0.890 $g/cm^3$ and a porosity of 59 percent.

The resin used was a combination of three commercially available resins: VERSAMID® 100, 930 and 940 polyamide resins from Cognis—Coatings & Inks, Ambler, Pa., USA).

Sheets of PTFE film were loaded with polyamide resin by floating a convenient sized sheet (about 15 cm (about 6 inches) by about 5 cm (about 2 inches)) on a solution of polyamide resins dissolved in an organic solvent mixture until the film became relatively transparent (about 5 seconds), removing the excess solvent from the surface of the sheet by drawing it across the edge of the solution container and allowing the sheet to dry.

The polyamide resin solution was made by mixing VERSAMID® 100, 930 and 940 resins, in a 48:22:30 weight ratio (VERSAMID® 100 resin was heated to about 80° C. to facilitate weighing), in a solvent containing xylene, 1-butanol, methanol and toluene, in a 1.2:47.9:50.9 weight ratio until the resins dissolved (about 24 hours). Three solutions, having 13, 25 and 50 weight percent polyamide resin were prepared.

Figure 4:
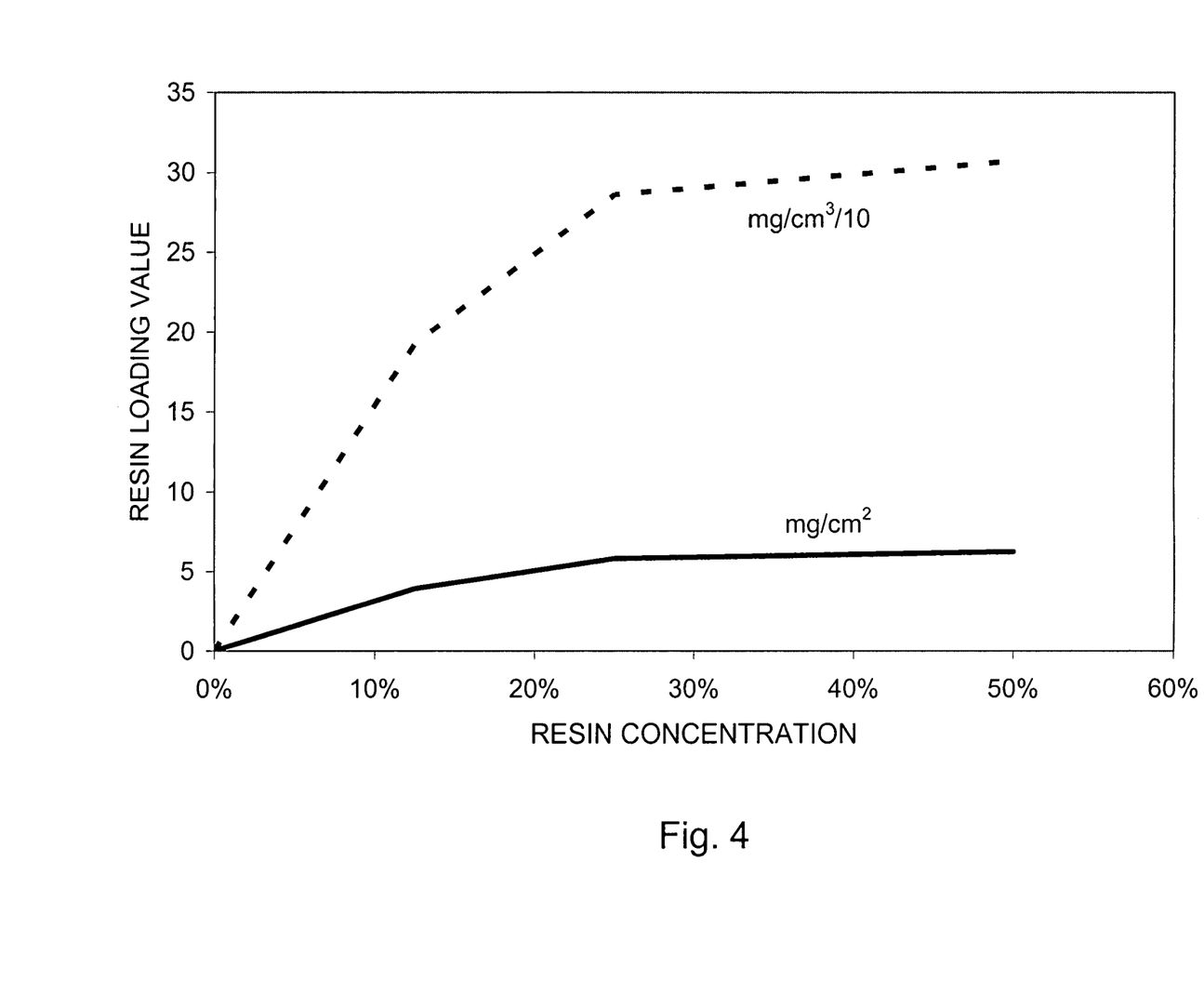
FIG. 4 is a graph of the resultant polyamide resin loading of PTFE film as a function of the polyamide resin concentration in solution used.

Sheets of the 0.203 mm (0.008 inch) thick PTFE film were loaded with the polyamide resin using solutions with several different resin concentrations. The resin loadings of the sheets were calculated (in both mg of resin per $cm^2$ of film surface area and mg of resin per $cm^3$ of film volume), and samples of each were tested on the Oxygen Diffusion Half-Cell Test as described in Example 1. The results are summarized in Table 6, and loading as a function of the resin concentration of the solution used is plotted in the graph in FIG. 4. The graph shows that nearly complete loading of the film was achieved with the 25 weight percent resin solution. The Oxygen Diffusion Half-Cell Test results show that the rate of oxygen diffusion is reduced by a relatively small amount with as much as 286 mg of resin per cm³ of PTFE film, but with a resin loading of 307 mg/cm³ the oxygen diffusion is reduced by about 68 percent.

TABLE 6

| Resin Concentration (wt %) | Loading (mg/cm²) | Loading (mg/cm³) | Reduction in O₂ Diffusion (%) |
|---|---|---|---|
| 13 | 3.9 | 193 | 3 |
| 25 | 5.8 | 286 | 7 |
| 50 | 6.2 | 307 | 68 |

Figure 5:
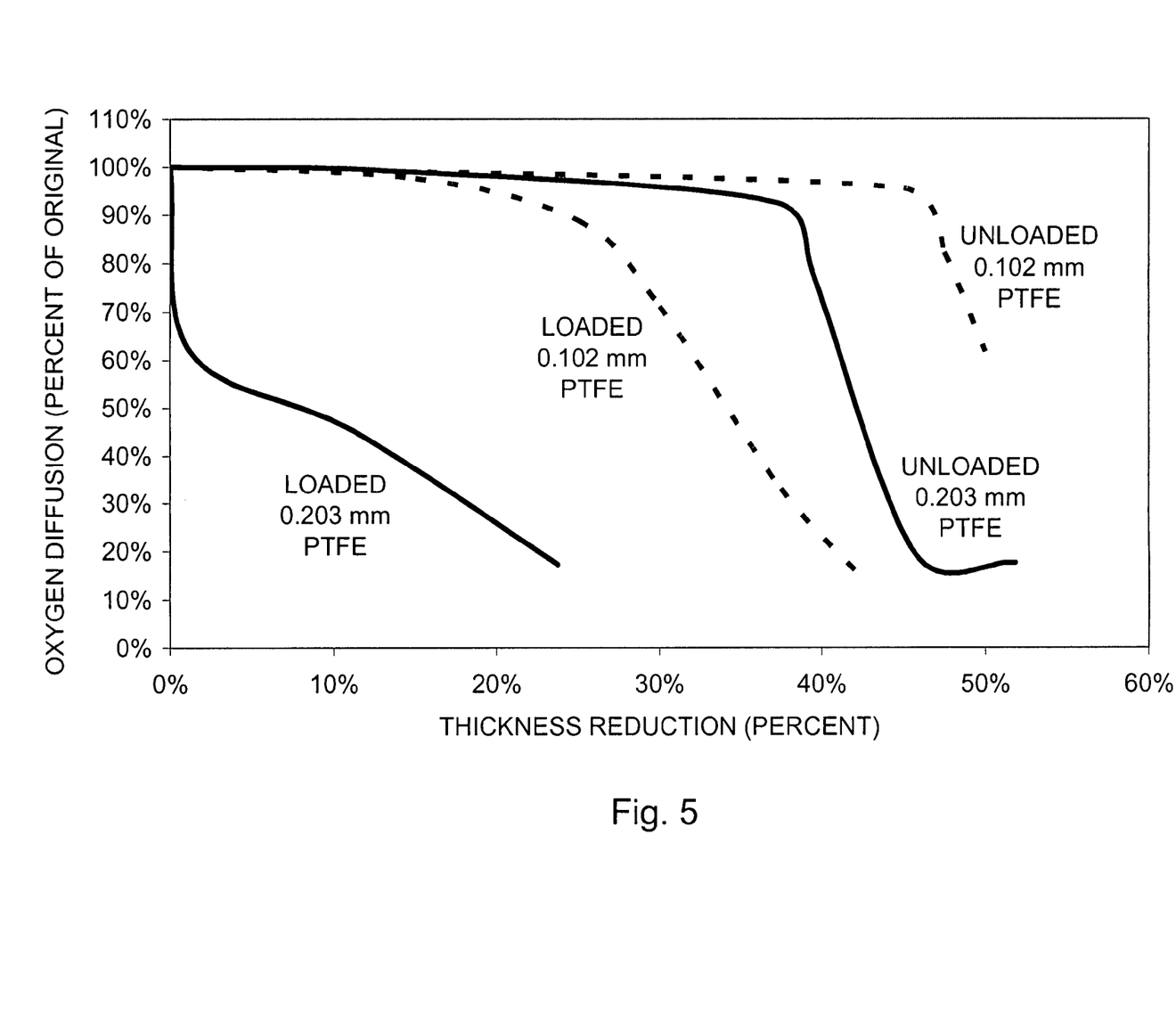
FIG. 5 is a graph of the oxygen diffusion of calendered PTFE film as a function of the percent reduction in thickness for PTFE films of different thicknesses, with and without polyamide loading.

Sheets of both 0.102 mm (0.004 inch) and 0.203 mm (0.008 inch) thick PTFE film were loaded with the polyamide resin using a 25 weight percent resin solution, with resultant loadings of 145 mg/cm³ (6 mg/cm²) and 290 mg/cm³ (6 mg/cm²), respectively. Samples of each of the sheets were compressed by various amounts by drawing through a roller mill to simulate compression (thickness reduction) that could occur within a cell due to an increase in internal pressure. The samples were then tested on the Oxygen Diffusion Half-Cell Test. The results are summarized in Table 7; the oxygen diffusion reductions shown are all percentages of unloaded, uncompressed PTFE film of the same thickness. The results are also plotted in the graph in FIG. 5.

TABLE 7

| Thickness Reduction (%) | 0.102 mm (0.004 inch) PTFE Film | | 0.203 mm (0.008 inch) PTFE Film | |
|---|---|---|---|---|
| | No Resin Loading | 145 mg/cm³ Resin Loading | No Resin Loading | 290 mg/cm³ Resin Loading |
| 0 | 0 | 0 | 0 | 0 |
| 5 | 0 | 1 | 0 | 48 |
| 10 | 1 | 2 | 1 | 52 |
| 15 | 1 | 2 | 1 | 62 |
| 20 | 1 | 5 | 2 | 74 |
| 25 | 2 | 11 | 3 | 85 |
| 30 | 2 | 29 | 4 | |
| 35 | 2 | 54 | 6 | |
| 40 | 3 | 77 | 28 | |
| 45 | 5 | 90 | 78 | |
| 50 | 38 | | 88 | |

EXAMPLE 7

PR44 cells were tested to determine the effect of loading the PTFE air distribution layer with polyamide resin. The cells were made according to FIG. 1, as described in Example 5, except that some cells had air diffusion layers made from 0.203 mm (0.008 inch) thick PTFE film loaded with the polyamide resin used in Example 6. For these cells the PTFE film was loaded using a 25 weight percent resin solution, resulting in a loading of about 271 to 295 mg/cm³ (5.5 to 6.0 mg/cm²).

Cells with the conventional unloaded 0.102 mm (0.004 inch) thick PTFE air distribution layer and cells with the loaded 0.203 mm (0.008 inch) thick PTFE air distribution layer were tested on the Capacity and Weight Gain tests described in Example 5. The average capacity of cells with the loaded air distribution layer was essentially the same as that of cells with the unloaded air distribution layer, and the average weight gain of cells with the loaded air distribution layer was 25 percent lower than cells with the unloaded air distribution layer.

While the invention is illustrated in the above Examples by embodiments of or that may be used in button zinc-air cells with an aqueous KOH electrolyte, it can also be adapted to other types of cells with oxygen reduction electrodes. For example, other electrolytes can be used, such as aqueous alkaline electrolytes comprising NaOH (e.g., alone or in combination with KOH and other suitable solutes) and nonaqueous electrolytes with organic solvents. Transformable materials used in the transformable components according to the invention will be selected based on their properties when contacted by the particular electrolyte used.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising:
    a non-hermetically sealed housing comprising a first wall having at least one air inlet;
    an oxygen reduction electrode disposed within the housing and comprising an oxygen reduction layer and an electrolyte impermeable layer, the electrolyte impermeable layer being disposed between the oxygen reduction layer and the first wall of the container;
    an electrolyte disposed within the housing; and
    a transformable component disposed between the housing wall having the at least one air inlet and the oxygen reduction electrode;
    wherein the transformable component, when contacted by the electrolyte, is capable of transformation to an electrolyte sealing component.

2. The cell defined by claim 1, wherein the electrolyte sealing component completely blocks electrolyte passage to the at least one air inlet.

3. The cell defined by claim 1, wherein the transformable component comprises pores and has a porosity.

4. The cell defined by claim 3, wherein the pores comprise through-pores and the transformation comprises a reduction in the number of through-pores.

5. The cell defined by claim 3, wherein the transformation comprises a reduced porosity.

6. The cell defined by claim 5, wherein the reduced porosity comprises at least partially collapsed pores.

7. The cell defined by claim 6, wherein the transformable component comprises a material, disposed within the pores, that is capable of adhesively sealing the at least partially collapsed pores.

8. The cell defined by claim 3, wherein the transformable component comprises a swellable material disposed within the pores and the swellable material is capable of swelling upon contact with the electrolyte.

9. The cell defined by claim 1, wherein the transformable component is capable of swelling upon contact with the electrolyte.

10. The cell defined by claim 9, wherein a surface of the electrolyte sealing component cooperates with the first wall of the housing to comprise at least a partial electrolyte seal.

11. The cell defined by claim 10, wherein the electrolyte sealing component is a first electrolyte sealing component and a second electrolyte sealing component is disposed between and cooperates with the first electrolyte sealing component and the first wall of the housing to comprise the at least partial electrolyte seal.

12. The cell defined by claim 9, wherein the transformable component is constrained between the oxygen reduction electrode and the container such that the pores are at least partially collapsed upon swelling of the transformable component.

13. The cell defined by claim 1, wherein the transformable component comprises at least one member selected from the group consisting of polyacrylates, polyvinyl alcohols and polyamides.

14. The cell defined by claim 13, wherein the transformable component comprises a base material comprising pores, and at least a portion of the at least one member selected from the group consisting of polyacrylates, polyvinyl alcohols and polyamides is disposed in the pores.

15. The cell defined by claim 14, wherein the at least one member comprises at least one polyvinyl alcohol.

16. The cell defined by claim 14, wherein the at least one member comprises at least one polyamide.

17. The cell defined by claim 14, wherein the at least one member comprises at least one polyacrylate.

18. The cell defined by claim 1, wherein the transformable component comprises an electrolyte absorbing material.

19. The cell defined by claim 1, wherein the transformable component comprises an electrolyte neutralizing material.

20. The cell defined by claim 1, wherein a first air permeable layer is disposed between the first wall of the container and the air electrode, adjacent to the hydrophobic layer.

21. The cell defined by claim 20, wherein the first air permeable layer comprises the transformable component.

22. The cell defined by claim 20, wherein a second air permeable layer is disposed between the first air permeable layer and the first wall of the housing, and the second air permeable layer comprises the transformable sealing component.

23. The cell defined by claim 1, wherein the cell is a metal-air cell.

24. The cell defined by claim 23, wherein the electrolyte comprises an alkaline solution of an electrolyte solute in water.

25. The cell defined by claim 24, wherein the cell is a zinc-air cell.

26. The cell defined by claim 25, wherein the oxygen reduction electrode comprises carbon.

27. The cell defined by claim 25, wherein the oxygen reduction electrode comprises a manganese oxide.

28. The cell defined by claim 1, wherein the cell is an air-assisted cell.

29. The cell defined by claim 28, wherein the electrolyte comprises an alkaline solution of an electrolyte solute and water.

30. The cell defined by claim 29, wherein the cell comprises a zinc-manganese dioxide cell.

31. The cell defined by claim 1, wherein the cell is a cylindrical cell having a height and a diameter.

32. The cell defined by claim 31, wherein the cell is a button type cell in which the cell height is less than the cell diameter.

33. The cell defined by claim 31, wherein the cell height is equal to or greater than the cell diameter.

34. The cell defined by claim 1, wherein the cell is non-cylindrical.

35. The cell defined by claim 1, wherein the cell is a prismatic cell.

36. The cell defined by claim 1, wherein the at least one air inlet is defined by an aperture in the first wall of the housing.

37. The cell defined by claim 1, wherein the at least one air inlet is disposed at an edge of the first wall of the housing.

38. The cell defined by claim 1, wherein the housing comprises a plurality of walls, each having at least one air inlet, and the cell comprises one or more transformable components such that the one or more transformable sealing components are disposed between the oxygen reduction electrode and all of the air inlets.

39. An electrochemical battery cell comprising:
a non-hermetically sealed housing comprising a first wall having at least one air inlet;
an oxygen reduction electrode disposed within the housing;
an electrolyte disposed within the housing;
an initially air permeable component disposed between the oxygen reduction electrode and the first wall of the housing, the initially air permeable component comprising a material that, when contacted by the electrolyte, is capable of transforming the initially air permeable component into an electrolyte sealing component.

40. The cell defined by claim 39, wherein the initially air permeable component comprises a base material and a transformable material.

41. The cell defined by claim 40, wherein the base material comprises pores in which the transformable material is disposed.

42. The cell defined by claim 39, wherein the electrolyte comprises an alkaline solution of an electrolyte solute in water.

43. The cell defined by claim 42, wherein the electrolyte solute comprises potassium hydroxide.

44. The cell defined by claim 42, wherein the transformable material comprises at least one material selected from the group consisting of polyacrylates, polyvinyl alcohols and polyamides.

45. The cell defined by claim 44, wherein the initially air permeable component comprises a base material comprising pores in which the transformable material is disposed.

46. The cell defined by claim 44, wherein the transformable material comprises at least one polyacrylate.

47. The cell defined by claim 44, wherein the transformable material comprises at least one polyvinyl alcohol.

48. The cell defined by claim 44, wherein the transformable material comprises at least one polyamide.

49. The cell defined by claim 48, wherein the initially air permeable material comprises base material comprising pores, at least a portion of the at least one polyamide is disposed within the pores and the initially air permeable material comprises less than 305 mg of the at least one polyamide per $cm^3$ of the base material.

50. The cell defined by claim 49, wherein the initially air permeable material comprises no more than 295 mg of the at least one polyamide per $cm^3$ of the base material.

51. The cell defined by claim 49, wherein the initially air permeable material comprises at least 110 mg of the at least one polyamide per $cm^3$ of the base material.

52. The cell defined by claim 51, wherein the initially air permeable material comprises at least 174 mg of the at least one polyamide per $cm^3$ of the base material.

53. The cell defined by claim 49, wherein the initially air permeable material has an initial porosity of up to 60 percent.

54. An electrochemical battery cell comprising:
a non-hermetically sealed housing comprising a first wall having at least one air inlet;
an oxygen reduction electrode disposed within the housing and comprising an oxygen reduction layer and an electrolyte impermeable layer, the electrolyte impermeable layer being disposed between the oxygen reduction layer and the first wall of the container;
an electrolyte disposed within the housing; and a transformable component comprising a base material comprising pores disposed between the housing wall having the at least one air inlet and the oxygen reduction electrode;

wherein the transformable component comprises a surface facing the oxygen reduction electrode, a pressure applied to that surface is capable of transforming the transformable component to an electrolyte sealing component and the transformation comprises at least a partial collapse of the pores.

* * * * *